(12) United States Patent
Drumm

(10) Patent No.: US 9,663,082 B2
(45) Date of Patent: May 30, 2017

(54) BRAKE SYSTEM FOR MOTOR VEHICLES

(71) Applicant: Continental Teves AG & Co. oHG, Frankfurt (DE)

(72) Inventor: Stefan Drumm, Saulheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/911,845

(22) PCT Filed: Aug. 1, 2014

(86) PCT No.: PCT/EP2014/066573
§ 371 (c)(1),
(2) Date: Feb. 12, 2016

(87) PCT Pub. No.: WO2015/022203
PCT Pub. Date: Feb. 19, 2015

(65) Prior Publication Data
US 2016/0193990 A1    Jul. 7, 2016

(30) Foreign Application Priority Data

Aug. 14, 2013  (DE) ......................... 10 2013 216 141

(51) Int. Cl.
*B60T 8/40* (2006.01)
*B60T 13/68* (2006.01)
(Continued)

(52) U.S. Cl.
CPC ............ *B60T 8/4077* (2013.01); *B60T 7/042* (2013.01); *B60T 13/146* (2013.01);
(Continued)

(58) Field of Classification Search
CPC .... B60T 13/146; B60T 13/662; B60T 13/686; B60T 13/745; B60T 7/042; B60T 8/4077
(Continued)

(56) References Cited

U.S. PATENT DOCUMENTS 5,015,043 A * 5/1991 Resch .................. B60T 8/4275
                                                    180/197
6,367,889 B1   4/2002 Tsubouchi et al.
(Continued)

FOREIGN PATENT DOCUMENTS

| DE | 10 2010 038 918 A1 | 11/2011 |
|---|---|---|
| DE | 10 2011 086 916 A1 | 5/2012 |
| JP | WO 2012086162 A1 | 6/2012 |

OTHER PUBLICATIONS

German Examination Report—Feb. 7, 2014.
PCT International Search Report—Oct. 24, 2014.

*Primary Examiner* — Tyler J Lee
(74) *Attorney, Agent, or Firm* — Brinks Gilson & Lione

(57) ABSTRACT

A brake system for motor vehicles, with a brake pedal for operating a master brake cylinder with a piston and pressure chamber connected to a wheel brake, a displacement sensor that detects the brake pedal displacement, a pedal force detection device that detects the brake pedal force, a brake pressure modulation unit applying pressure to the wheel brakes and regulating the wheel brakes individually. A cylinder-piston device for hydraulically producing a force that acts on the master cylinder piston in addition to the pedal force. A pressure supply device to supply pressure medium into the cylinder-piston arrangement. A hydraulic device supplying pressure medium into the brake circuit. A cylinder-piston arrangement upstream of the master brake cylinder generates a force acting on the master cylinder piston. An electronic control and regulation unit, executes an algorithm for the regulation of the brake system pressure.

10 Claims, 4 Drawing Sheets

(51) Int. Cl.
*B60T 13/14* (2006.01)
*B60T 13/74* (2006.01)
*B60T 7/04* (2006.01)
*B60T 13/66* (2006.01)

(52) U.S. Cl.
CPC .......... *B60T 13/662* (2013.01); *B60T 13/686* (2013.01); *B60T 13/745* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 8,457,854 B2* | 6/2013 | Lubbers | .................. | B60T 7/042 |
| | | | | 303/191 |
| 8,944,526 B2* | 2/2015 | Nishioka | .................. | B60T 7/042 |
| | | | | 303/14 |
| 2010/0179740 A1* | 7/2010 | Lubbers | .................. | B60T 7/042 |
| | | | | 701/70 |
| 2013/0270895 A1* | 10/2013 | Nishioka | .................. | B60T 7/042 |
| | | | | 303/14 |

* cited by examiner

US 9,663,082 B2

BRAKE SYSTEM FOR MOTOR VEHICLES

CROSS REFERENCE TO RELATED APPLICATIONS

This application claims priority to German Patent Application Nos. 10 2013 216 141.7, filed Aug. 14, 2013 and PCT/EP2014/066573, filed Aug. 1, 2014.

FIELD OF THE INVENTION

The present invention concerns a brake system for motor vehicles, with a brake pedal for operating a master brake cylinder with at least one hydraulic piston, at least one pressure chamber and at least one connected brake circuit that is placed under a brake system pressure when the brake pedal is operated and to which are connected hydraulically activated wheel brakes that are associated with wheels of the motor vehicle, a displacement detection device that detects the operating displacement of the brake pedal or of a piston connected to the brake pedal, a pedal force detection device that detects the force exerted by the brake pedal on the master brake cylinder, a brake pressure modulation unit that is designed to pass the brake system pressure to the wheel brakes and, if necessary, to regulate the wheel brakes individually, a cylinder-piston device connected upstream of the master brake cylinder for hydraulically producing a force that acts on the piston of the master brake cylinder in the operation direction in addition to the pedal force acting on the piston, a pressure supply device for feeding a pressure medium into the cylinder-piston arrangement, a hydraulic device for supplying a pressure medium into the brake circuit, a cylinder-piston arrangement connected upstream of the master brake cylinder for the hydraulic generation of a force acting on the master cylinder piston in the operating direction in addition to the pedal force, an electronic control and regulation unit, in which an algorithm for the regulation of the brake system pressure is implemented, and at least one pressure sensor for detecting the brake system pressure.

BACKGROUND

One brake system related to the above mentioned system is known from the older patent application DE 10 2011 086 916 A1 of the applicant. The special feature of the prior art brake system is that with braking processes assisted by boosting forces the volume of pressure medium delivered to the wheel brakes is composed of a first pressure medium volumetric component, which is output by the master brake cylinder, and a second pressure medium volumetric component, which is controlled by the device for producing the boosting force. However, the above-referenced application discloses no reference to a control engineering method for the simultaneous provision of an optimal brake pedal feel and a brake system pressure.

Starting from the previously described prior art, the object of the present invention is to propose a brake system with which an optimal brake pedal feel and a brake system pressure can be provided at the same time.

This object is achieved according to the invention by a brake system described herein.

BRIEF DESCRIPTION OF THE DRAWINGS

The present invention is described in detail in the following description in combination with the accompanying schematic figures for two exemplary embodiments. In the figures.

DETAILED DESCRIPTION OF THE INVENTION

Figure 1:
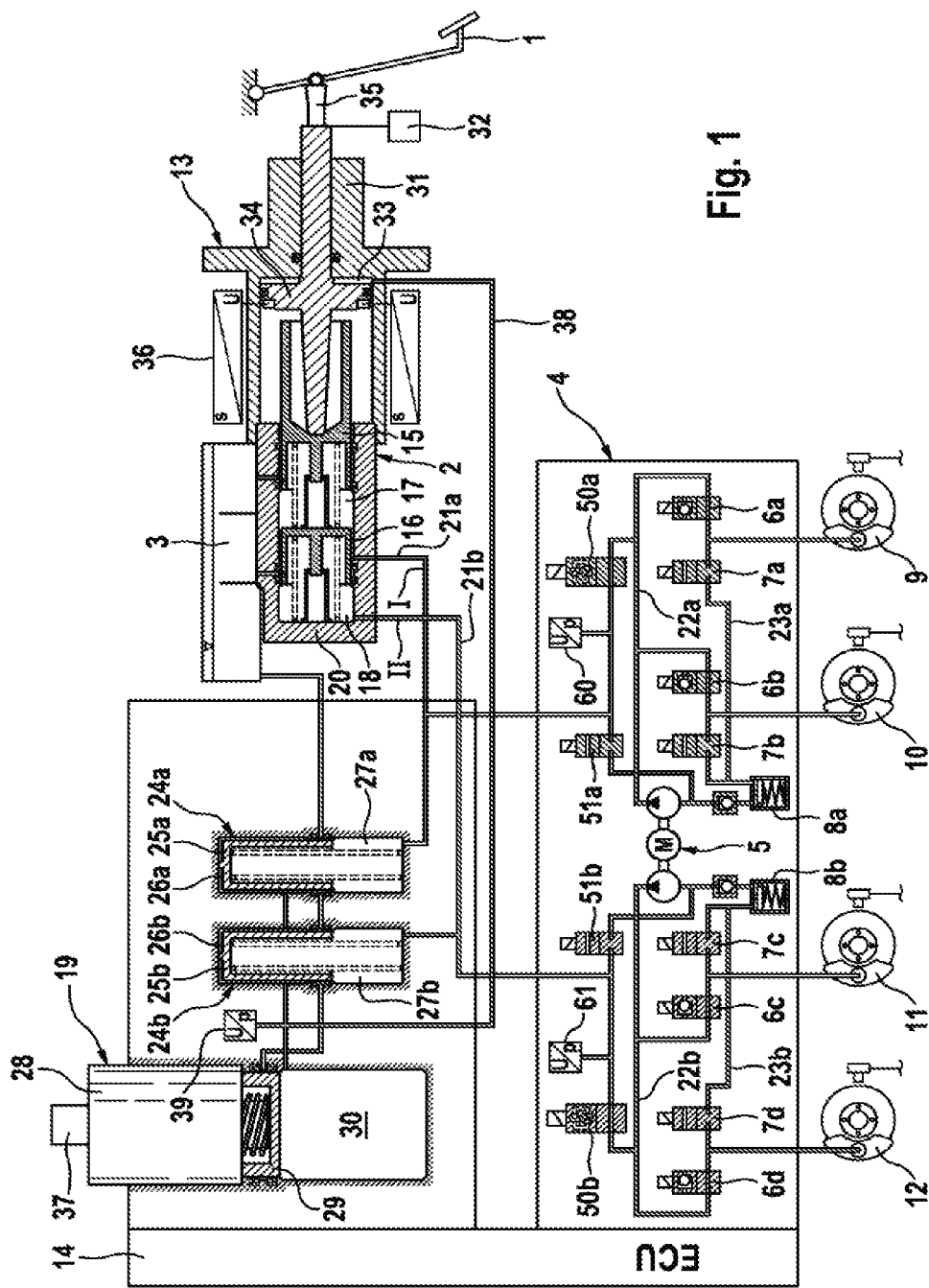
FIG. 1 shows a hydraulic circuit diagram of an exemplary embodiment of a brake system according to the invention.

The brake system that is shown in the figures essentially includes a hydraulic master brake cylinder 2 in a tandem implementation operated by an operating pedal or a brake pedal 1, a cylinder-piston arrangement 13 connected upstream of the master brake cylinder 2, a pressure medium reservoir container 3, a brake pressure modulation unit 4, to the output ports of which wheel brakes 9, 10, 11, 12 of a motor vehicle that is not shown are connected, with a motor-pump unit 5, electrically controllable pressure modulation valves or inlet and outlet valves 6a-6d, 7a-7d, as well as with low pressure storage devices 8a, 8b, in addition an electrically controllable pressure supply device 19 for producing a boosting force, and an electronic control and regulation unit 14 that activates the electrically controllable components. The input ports of the inlet valves 6a-6d are supplied with brake medium at pressures that are referred to as brake system pressures conducted by system pressure lines 22a, 22b, whilst return lines 23a, 23b connect the output ports of the outlet valves 7a-7d to the aforementioned low pressure storage devices 8a, 8b.

As is also shown in FIG. 1, the hydraulic master brake cylinder 2 of the brake system according to the example includes two hydraulic pistons 15, 16 that are disposed one after the other in a housing 20 and that bound hydraulic chambers or pressure chambers 17, 18. The pressure chambers 17, 18 are connected to the pressure medium reservoir container 3 on the one hand via bores formed in the pistons 15, 16 as well as by corresponding pressure equalization lines, wherein the same can be shut off by a relative displacement of the pistons 15, 16 in the housing 20. The pressure chambers 17, 18 also contain restoring springs that are not referred to in detail and that position the pistons 15, 16 into an initial position with the master brake cylinder 2 not operated. Separate brake circuits I, II associated with the pairs of wheel brakes 9, 10 or 11, 12 are connected to the pressure chambers 16, 17 by circuit pressure lines 21a, 21b, to which the aforementioned system pressure lines 22a, 22b are connected by pressure increasing valves 50a, 50b. Moreover, the suction sides of the pumps of the motor-pump units 5 can also be connected to the circuit pressure lines 21a, 21b by pressure medium feed valves 51a, 51b, whereby using the pumps pressure medium can be fed to the system pressure lines 22a, 22b by the circuit pressure lines 21a, 21b for the purpose of a pressure increase that is controllable with the pressure increasing valves 50a, 50b. Pressure sensors 60, 61 are provided for detecting the pressures occurring in the circuit pressure lines 21a, 21b. The output ports of each separating piston device 24a, 24b are connected to the circuit pressure lines 21a, 21b in the exemplary embodiment shown. The separating piston devices 24a, 24b are essentially formed by actuation chambers 26a, 26b bounded by separating pistons 25a, 25b and pressure output chambers 27a, 27b, wherein the pressure output chambers 27a, 27b accommodate the restoring springs, which are not referred to in detail, that bias the separating pistons 25a, 25b.

As is also shown in the figures, the upstream hydraulic piston-cylinder arrangement 13 connected upstream of the master brake cylinder 2 includes a booster piston 34 bounding a booster chamber 33 in a booster housing 31, the booster piston 34 also being connected to the aforementioned first master cylinder piston 15 in a force-transfer manner. The booster chamber 33 is hydraulically connected, together with the actuation chambers 26a, 26b, to the pressure chamber 30 of an electrically controllable pressure supply device 19, wherein the actuator pressure that is present in the connected chambers is detected by a pressure sensor 39. A piston rod 35 couples the pivotal displacement of the brake pedal 1 resulting from a pedal operation to the translational displacement of the booster piston 34, the operating displacement s of which is detected by a preferably redundantly implemented displacement sensor 36. As a result, the corresponding piston displacement signal is a measure of the brake pedal operation angle. Moreover, a force sensor 32 for detecting the pedal force F acting on the brake pedal 1 during the operation is provided, and is also preferably implemented redundantly. As an alternative to the use of a force sensor 32, the pedal force signal F can be indirectly determined from detected hydraulic pressure values. The pedal travel or the pedal angle or the piston travel and the directly measured or indirectly determined pedal force represent a braking intention by a vehicle driver.

Moreover, it can be seen from the graphical representation of the brake system according to the invention that the aforementioned pressure supply device 19 is in the form of an electrically controllable hydraulic pressure source or an electrohydraulic actuator, the piston 29 of which can be operated by a schematically indicated electric motor 28 with the interposition of a rotation-translation gearbox that is not shown. A rotor position sensor that is used for the detection of the rotor position of the electric motor 28 is referred to with the reference character 37. Optionally, further sensors that are not shown can detect additional motor parameters, such as the motor currents and the winding temperature. The piston 29 bounds a pressure chamber 30 that is connected on the one hand by means of a hydraulic line 38 to the aforementioned booster chamber 33, so that the boosting force acting towards the master brake cylinder piston 15 in the operating direction is produced by the action of the hydraulic pressure regulated in the pressure chamber 30. On the other hand, the aforementioned actuation chambers 26a, 26b of the separating piston devices 24a, 24b can be subjected to the pressure regulated in the pressure chamber 30. A sensor connected to the pressure chamber 30 for indirectly detecting the boosting force is in the form of a pressure sensor 39 in this case.

Figure 2:
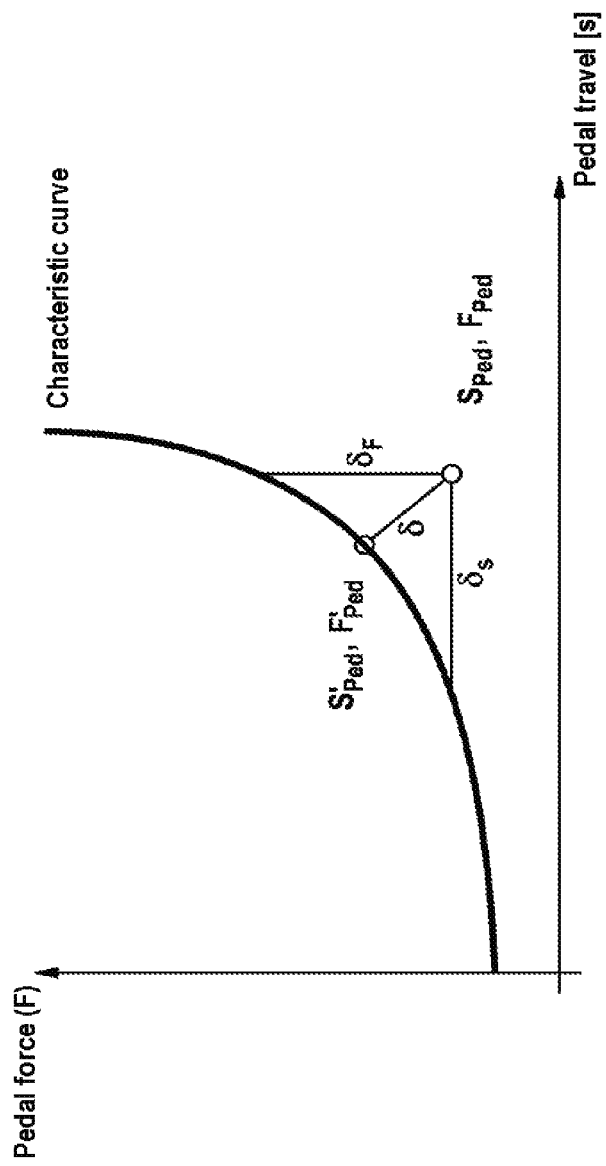
FIG. 2 shows a predeterminable characteristic showing the relationship between brake pedal displacement and brake pedal force.

FIG. 2 shows the brake pedal characteristic of the brake pedal 1 in the $S_{Ped}$-$F_{Ped}$ plane, i.e. the dependency of the pedal force $F_{Ped}$ acting on the brake pedal 1 during operation by the vehicle driver on the operating travel or pedal travel $s_{Ped}$ detected by the displacement sensor 36. The brake pedal characteristic is described by a mathematical function of the dependency of the pedal force on the pedal travel $F_{soll}[s_{Ped}]$ or the inverse function thereof $S_{soll}[F_{Ped}]$, which represents the dependency of the pedal travel on the pedal force.

In order to produce the mentioned relationship according to the brake pedal characteristic, the electronic control and regulation unit 14 mentioned in connection with FIG. 1 contains an electronic regulator 40 (FIGS. 3, 4) that calculates a control variable, for example a target value for the electric current fed to the pressure supply device 19. According to the invention, the regulator 40 is implemented as an optimal regulator that activates the pressure supply device 19 such that a pedal state s, F that has been discovered, and that is defined by the brake pedal displacement s and the brake pedal force F, is converted into a target state s', F' by a control method that is optimal in the mathematical sense, wherein the method minimizes a quality criterion. In this case the optimal regulator 40 uses as the quality criterion the distance δ of the brake pedal state from the predetermined brake pedal characteristic, i.e. the corresponding curve/characteristic line in the {s, F}-state plane.

The brake pedal travel s and the brake pedal force F are also referred to below with $s_{Ped}$ and $F_{Ped}$.

The optimal control method consists in this case of associating the state ($s_{Ped}$, $F_{Ped}$) that has been discovered as a target state ($s_{Ped'}$, $F_{Ped'}$) with the point lying on the brake pedal characteristic or characteristic line at the shortest distance from the state ($s_{Ped}$, $F_{Ped}$) that has been discovered (FIG. 2). The following is calculated as a practical approximation formula for the distance δ

$$\delta \approx ((\lambda_s \delta_s)^{-2} + (\lambda_F \delta_F)^{-2})^{-1/2} = \sqrt{\frac{1}{\frac{1}{(\lambda_s \delta_s)^2} + \frac{1}{(\lambda_F \delta_F)^2}}}$$

with the travel deviation $$\delta_s = S_{Ped} - S_{soll}[F_{Ped}]$$

and the force deviation $$\delta_F = F_{Ped} - F_{soll}[s_{Ped}],$$

wherein $\lambda_s$ and $\lambda_F$ are scaling factors and $S_{soll}[F_{Ped}]$ and $F_{soll}[s_{Ped}]$ are functional representations of the predetermined characteristic line that are triggered according to the pedal travel and according to the pedal force. The two functions are held ready in the electronic regulator 40, for example in tabular form, so that the quality measure can be calculated directly.

Figure 3:
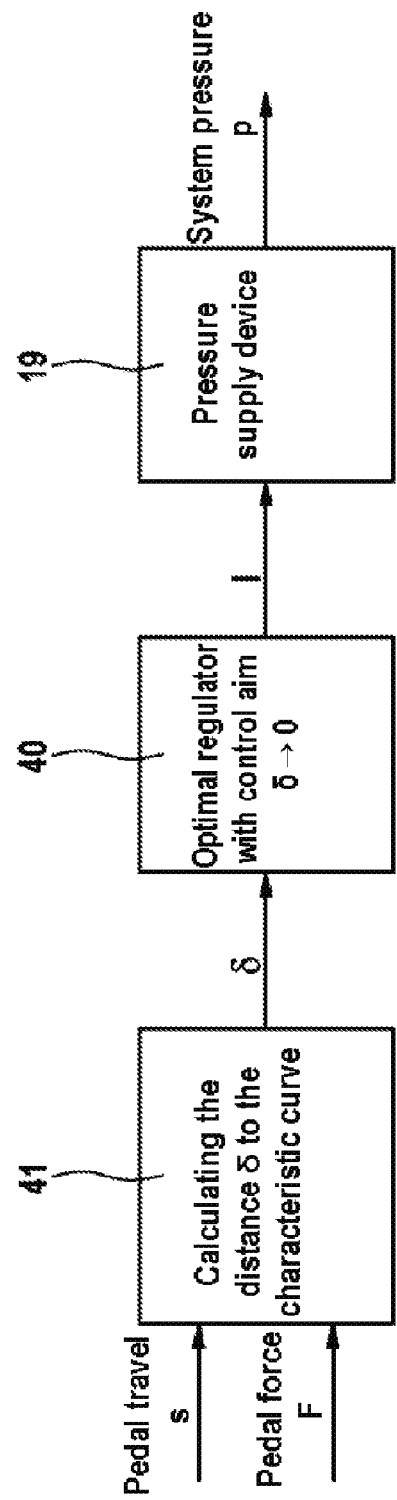
FIG. 3 shows the simplified structure of a control path of the electronic control and regulation unit according to the present invention containing an optimal regulator.
Figure 4:
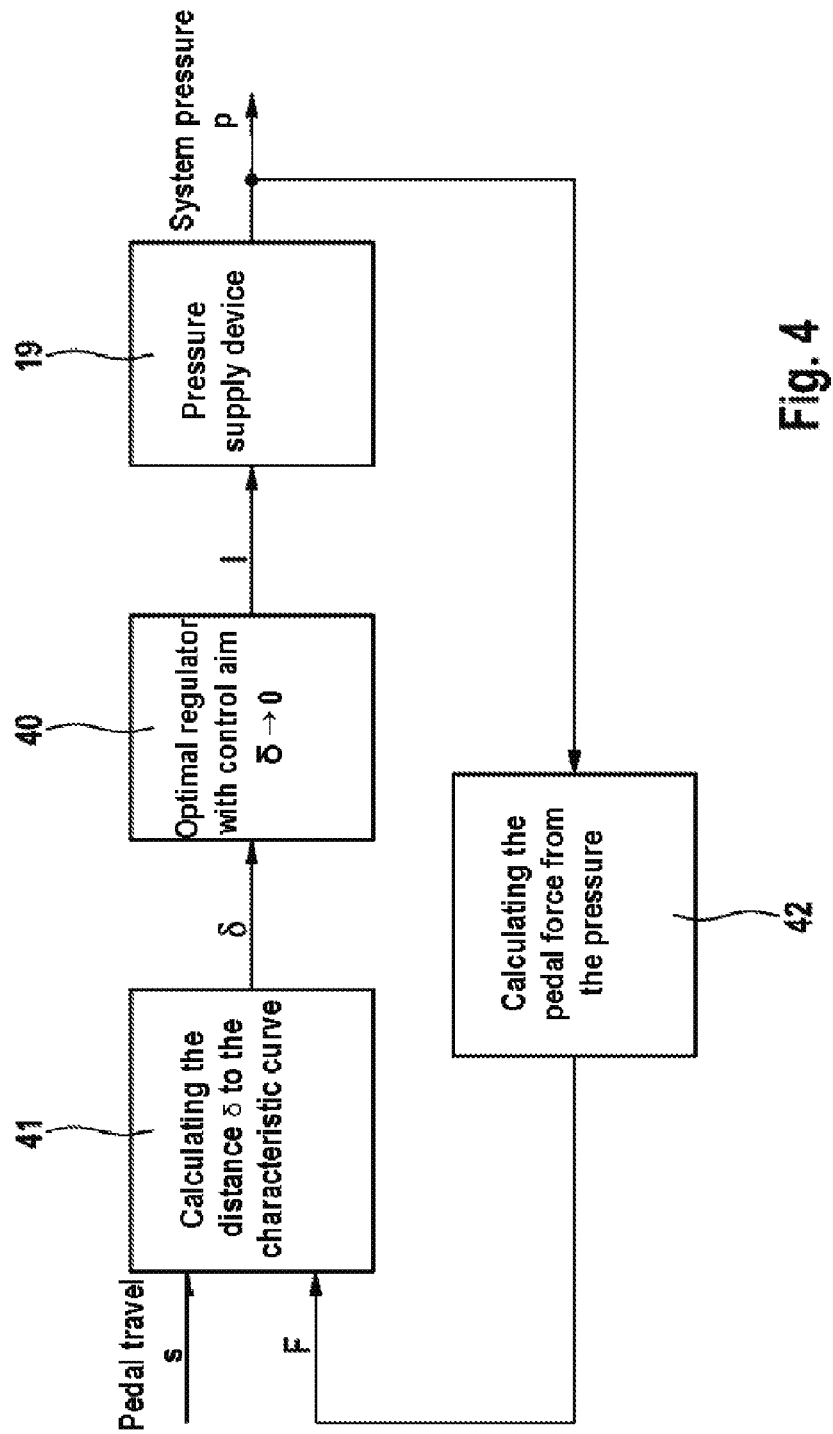
FIG. 4 shows a modification of the control path shown in FIG. 3.

The control paths used to implement the above steps of the method are shown in FIGS. 3 and 4. With the control path shown in FIG. 3, the output signal of the displacement sensor 36 mentioned in connection with FIG. 1 and the output signal of a force sensor that is not shown are fed to a first calculation module 41 as input signals. Following the calculation of the distance δ in the calculation module 41, the distance is provided to the optimal regulator 40 with the control aim δ→0, which provides as its output variable the activation current I to act upon the pressure supply device 19, which outputs the actuator pressure $p_{Actuator}$, which is detected by the pressure sensor 39.

With the version shown in FIG. 4, the use of the force sensor can be dispensed with, since the pedal force F is determined in a second calculation module 42 from the pressure $p_{syst}$ of the first brake circuit and the actuator pressure $P_{Act}$ using the force balance $$F = A_{THZ} * P_{syst} - A_{RK} * p_{Act},$$

wherein the effective hydraulic areas of the first master cylinder piston 15 and booster piston 34 are designated by $A_{THZ}$ and $A_{RK}$.

Otherwise, the operation of the brake system according to the invention is revealed to the expert person active within the relevant technical field by the disclosure contents of the present description and the claims, and therefore needs no more detailed description.

While the above description constitutes the preferred embodiment of the present invention, it will be appreciated that the invention is susceptible to modification, variation and change without departing from the proper scope and fair meaning of the accompanying claims.

The invention claimed is:

1. A brake system for motor vehicles, comprising a brake pedal for operating a master brake cylinder with at least one hydraulic piston, at least one pressure chamber and at least one connected brake circuit that is placed under a brake system pressure of a pressure medium when the brake pedal is operated and the at least one connected brake circuit is connected to at least one hydraulically activated wheel brake that are associated with wheels of the motor vehicle,
- a displacement detection device, which detects an operating displacement of the brake pedal or of a component connected to the brake pedal,
- a pedal force detection device, which detects a force exerted on the brake pedal acting on the master brake cylinder,
- a brake pressure modulation unit that passes the brake system pressure to the wheel brakes or to regulate a brake pressure applied to the wheel brakes individually,
- an electrically controllable pressure supply device for supplying the pressure medium to the brake system,
- a cylinder-piston arrangement connected upstream of the master brake cylinder for the hydraulic generation of a force acting on the master cylinder piston in an operation direction in addition to the force exerted on the brake pedal,
- an electronic control and regulation unit, operated using a method for the regulation of the brake system pressure,
- at least one pressure sensor for detecting the brake system pressure, and
- the electronic control and regulation unit configured to activate the pressure supply device to produce a defined brake pedal state that has been determined by the electronic control and regulation unit wherein the state that is defined by the brake pedal travel and the brake pedal force is converted into a target state by a control method that minimizes a quality criterion related to a difference between the brake pedal travel and the brake pedal force and the target state.

2. The brake system as claimed in claim 1, further comprising in that the electronic control and regulation unit uses the displacement of the brake pedal state from a predetermined brake pedal characteristic as the quality criterion.

3. The brake system as claimed in claim 2, further comprising in that the brake pedal characteristic is described by a mathematical function of a dependency of the brake pedal force on the brake pedal travel or an inverse function thereof, which represents the dependency of the brake pedal travel on the brake pedal force.

4. The brake system as claimed in claim 1 further comprising in that the control method consists of associating a point lying on the brake pedal characteristic that is at a shortest distance from a previous brake pedal state with a previous brake pedal state as the target state.

5. The brake system as claimed in claim 2 further comprising in that the quality criterion is calculated according to the formulas;

$$\delta \approx ((\lambda_s \delta_s)^{-2}+(\lambda_F \delta_F)^{-2})^{-1/2}$$

with the travel deviation $$\delta_s = s_{Ped} - S_{soll}[F_{Ped}]$$

and the force deviation $$\delta_F = F_{Ped} - F_{soll}[s_{Ped}],$$

wherein $\lambda_s$ and $\lambda_F$ are scaling factors,
$\delta$ is a distance, and
wherein $S_{soll}[F_{Ped}]$ and $F_{soll}[S_{Ped}]$ are functional representations of the predetermined characteristic.

6. The brake system as claimed in claim 2 further comprising in that the predetermined brake pedal characteristic is stored in the electronic control and regulation unit in the form of a numerical table.

7. The brake system as claimed in claim 1 further comprising in that the supply of the pressure medium into the brake circuit is carried out by a separating piston device.

8. The brake system as claimed in claim 1 further comprising in that the supply of the pressure medium into the brake circuits of a dual circuit brake system is carried out by a separating piston device associated with each of the brake circuits.

9. The brake system as claimed in claim 1 further comprising in that the electronic control and regulation unit determines the brake pedal force from detected the brake system pressure values and a pressure value provided by the pressure supply device.

10. The brake system as claimed in claim 9, further comprising in that the brake pedal force is calculated according to the following formula:

$$F = A_{THZ} * p_{syst} - A_{RK} * p_{Act}$$

wherein the following designations are used;
$A_{THZ}$ the effective hydraulic area of the master cylinder piston,
$p_{syst}$ the brake system pressure,
$A_{RK}$ the effective hydraulic area of a piston of the cylinder-piston arrangement, and
$p_{Act}$ the pressure provided by the pressure supply device.

* * * * *